(12) United States Patent
Li

(10) Patent No.: US 10,821,988 B2
(45) Date of Patent: Nov. 3, 2020

(54) VEHICLE CONTROL SYSTEM BASED ON FACE RECOGNITION

(71) Applicants: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

(72) Inventor: Shufu Li, Hangzhou (CN)

(73) Assignees: ZHEJIANG GEELY HOLDING GROUP CO., LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 194 days.

(21) Appl. No.: 15/771,604

(22) PCT Filed: Oct. 18, 2016

(86) PCT No.: PCT/CN2016/102423
§ 371 (c)(1),
(2) Date: Apr. 27, 2018

(87) PCT Pub. No.: WO2017/071502
PCT Pub. Date: May 4, 2017

(65) Prior Publication Data
US 2018/0312168 A1  Nov. 1, 2018

(30) Foreign Application Priority Data
Oct. 27, 2015 (CN) .......................... 2015 1 0707173

(51) Int. Cl.
*B60W 40/08* (2012.01)
*B60R 16/037* (2006.01)
*G06K 9/00* (2006.01)
*B60W 50/00* (2006.01)

(52) U.S. Cl.
CPC ........... *B60W 40/08* (2013.01); *B60R 16/037* (2013.01); *G06K 9/00288* (2013.01);
(Continued)

(58) Field of Classification Search
CPC ......... B60W 40/08; B60W 2040/0809; B60W 2050/0083; B60W 2540/28; B60R 16/037; G06K 9/00288; G06K 9/00832
(Continued)

(56) References Cited

U.S. PATENT DOCUMENTS 5,008,946 A * 4/1991 Ando ................. B60H 1/00757
382/104
7,110,570 B1 * 9/2006 Berenz .................... B60R 25/25
382/104

(Continued)

FOREIGN PATENT DOCUMENTS

CN          101301881 A       11/2008
CN          101844548 A        9/2010
(Continued)

OTHER PUBLICATIONS

International Search Report and Written Opinion for corresponding International Application No. PCT/CN2016/102423, dated Jan. 20, 2017, 13 pages.

*Primary Examiner* — Yazan A Soofi
*Assistant Examiner* — Naeem Taslim Alam
(74) *Attorney, Agent, or Firm* — Alston & Bird LLP

(57) ABSTRACT

Provided is a vehicle control system based on human face recognition, which relates to vehicles. The vehicle control system includes an image acquisition device, a storage, a processor and an actuator. It acquires current human face image information by the image acquisition device, stores known human face image information and pre-stored vehicle function configuration information corresponding
(Continued)

thereto by the storage, computes and determines human face image information matching the current human face image information in the known human face image information by the processor, and configures a vehicle according to corresponding vehicle function configuration information by the actuator. By pre-storing passenger data, the vehicle control system may employ a touch-type manipulation system. Vehicle function configuration information may include driving function configuration information and non-driving function configuration information to satisfy individualized needs of different drivers, enable the user of a vehicle to obtain better user experience, and greatly improve the comfort of the vehicle.

10 Claims, 1 Drawing Sheet

(52) U.S. Cl.
CPC . *G06K 9/00832* (2013.01); *B60W 2040/0809* (2013.01); *B60W 2050/0083* (2013.01); *B60W 2540/043* (2020.02)

(58) Field of Classification Search
USPC .......................................................... 701/36
See application file for complete search history.

(56) References Cited

U.S. PATENT DOCUMENTS

| 7,602,947 | B1 * | 10/2009 | Lemelson | B60Q 1/0023 |
|---|---|---|---|---|
| | | | | 340/426.1 |
| 2002/0197976 | A1 | 12/2002 | Liu et al. | |
| 2006/0072792 | A1 * | 4/2006 | Toda | B60R 25/1004 |
| | | | | 382/115 |
| 2007/0299577 | A1 | 12/2007 | Hattori et al. | |
| 2008/0228358 | A1 | 9/2008 | Wang et al. | |
| 2010/0232658 | A1 * | 9/2010 | Omoto | B60R 25/04 |
| | | | | 382/118 |
| 2011/0279282 | A1 | 11/2011 | Bryant | |
| 2012/0170817 | A1 | 7/2012 | Yang et al. | |
| 2013/0311001 | A1 * | 11/2013 | Hampiholi | B60R 25/25 |
| | | | | 701/1 |
| 2014/0142805 | A1 * | 5/2014 | Frye | B60K 35/00 |
| | | | | 701/36 |
| 2014/0358327 | A1 * | 12/2014 | Nordbruch | B60W 50/087 |
| | | | | 701/1 |
| 2016/0264147 | A1 * | 9/2016 | Mueller | B60W 50/0098 |
| 2016/0368438 | A1 | 12/2016 | Qian | |
| 2017/0088098 | A1 * | 3/2017 | Frank | G06K 9/00362 |

FOREIGN PATENT DOCUMENTS

| CN | 102529978 A | 7/2012 |
|---|---|---|
| CN | 103455143 A | 12/2013 |
| CN | 103707781 A | 4/2014 |
| CN | 104252615 A | 12/2014 |
| CN | 104590130 A | 5/2015 |
| CN | 104901976 A | 9/2015 |
| CN | 105128773 A | 12/2015 |
| CN | 105235615 A | 1/2016 |
| CN | 105270297 A | 1/2016 |

* cited by examiner

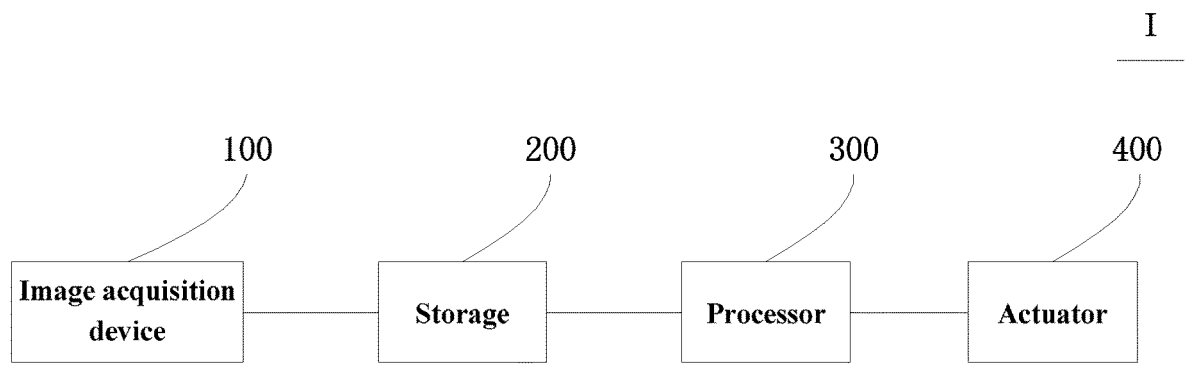

VEHICLE CONTROL SYSTEM BASED ON FACE RECOGNITION

CROSS-REFERENCE TO RELATED APPLICATIONS

The present application is a national phase entry of International Application No. PCT/CN2016/102423, filed Oct. 18, 2016, which claims priority to Chinese Patent Application No. 201510707173.1, filed Oct. 27, 2015, which are incorporated herein by reference in their entirety.

FIELD OF THE INVENTION

The invention relates to vehicles, and in particular, to a vehicle control system based on human face recognition.

BACKGROUND OF THE INVENTION

A vehicle generally refers to all the cars. In the following, cars are taken as an example for illustration. As a means of transportation, cars expand the radius of people's daily life, accelerate the speed of transportation of goods, improve the quality of life, and make holiday travel more convenient. With the development of China's economy and automobile industry, more and more cars have entered the families of ordinary people.

Under normal circumstances, there is more than one daily driver for a car, and after a driver gets on the car, he will adjust an apparatus such as the car seat, the reversing mirror and the reflector, etc. according to his own height, body shape and personal preferences.

Although a seat memory function is set on some high-grade cars, there are generally at most three memory buttons that are set since the arrangement space of the seat or the car door is limited. Even though the seat memory adjustment of very few vehicles matches the remote key, and one to two memory buttons can be added to them, this still cannot satisfy individualized needs of different drivers.

SUMMARY OF THE INVENTION

To solve the problem that the vehicle in the prior art cannot satisfy individualized needs of different drivers, an object of the invention is to provide a vehicle control system based on human face recognition, comprising:

an image acquisition device, acquiring current human face image information of a current occupant in a vehicle;

a storage, storing one or more pieces of known human face image information and preset vehicle function configuration information corresponding to the known human face image information respectively;

a processor, performing matching calculation on the current human face image information and the known human face image information so as to determine the matching human face image information which matches the current human face image information in the known human face image information; and an actuator, configuring the vehicle according to the vehicle function configuration information corresponding to the matching human face image information.

Further, the image acquisition device is arranged to only acquire the current human face image information of the current occupant at the main driver's seat of the vehicle.

Further, the vehicle function configuration information comprises driving function configuration information and non-driving function configuration information.

Further, the image acquisition device is arranged to be capable of acquiring the current human face image information of multiple current occupants at multiple seating positions of the vehicle, and the processor is further used for determining the seating position where the current occupant corresponding to the current human face image information is in the vehicle.

Further, the image acquisition device comprises multiple cameras correspondingly arranged at the multiple seating positions of the vehicle respectively, and the processor determines the seating position of the current occupant corresponding to the current human face image information according to the camera corresponding to the current human face image information.

Further, the image acquisition device comprises a camera arranged to be capable of acquiring current human face image information of the multiple current occupants at the multiple seating positions in the vehicle at one time, and the processor determines the seating position of the current occupant corresponding to the current human face image information by way of image processing.

Further, the image acquisition device comprises a camera arranged to be capable of acquiring current human face image information of the multiple current occupants at the multiple seating positions in the vehicle by way of scanning, and the processor determines the seating position of the current occupant corresponding to the current human face image information according to the scanning position and/or angle of the camera corresponding to the current human face image information.

Further, the vehicle function configuration information comprises driving function configuration information.

Further, the actuator configures the vehicle according to the driving function configuration information corresponding to the matching human face image information corresponding to the current human face image information of the current person at the main driver's seat of the vehicle.

Further, the vehicle function configuration information further comprises non-driving function configuration information.

Further, the storage is further used to store the preset priorities of the non-driving function configuration information corresponding to the known human face image information.

Further, the actuator configures the vehicle according to the non-driving function configuration information with the highest preset priority in multiple pieces of non-driving function configuration information corresponding to the matching human face image information corresponding to multiple pieces of known human face image information.

The vehicle control system based on human face recognition described in the invention acquires current human face image information by the image acquisition device, stores known human face image information and pre-stored vehicle function configuration information corresponding thereto by the storage, computes and determines human face image information matching the current human face image information in the known human face image information by the processor, and configures a vehicle according to corresponding vehicle function configuration information by the actuator. Since the vehicle control system based on human face recognition of the invention can pre-store more passenger data, the invention may employ a touch-type manipulation system, and the vehicle function configuration information of the invention comprises driving function configuration information and non-driving function configuration information, and it overcomes the limitation of the prior art that the fixed button setting can only be three to five, and overcomes the limitation of the prior art that it can only adjust the seat, the invention can satisfy individualized needs of different drivers, enable the user of a vehicle to obtain better user experience, and greatly improve the comfort of the vehicle.

The above and other objects, advantages and features of the invention will become clearer to the skilled in the art according to the detailed description of specific embodiments of the invention in conjunction with the drawings.

BRIEF DESCRIPTION OF THE DRAWINGS

In the following, some specific embodiments of the invention will be described in detail with reference to the drawings in an exemplary and non-limiting manner. In the drawings, identical reference signs denote identical or similar components or parts. It shall be appreciated by those skilled in the art that these drawings are not necessarily drawn to scale.

In the drawings:

FIG. 1 is a logic control diagram of a vehicle control system based on human face recognition according to an embodiment of the invention.

The meanings of various signs in the FIGURE are as follows:

I Vehicle control system
100 Image acquisition device
200 Storage
300 Processor
400 Actuator.

DETAILED DESCRIPTION OF THE INVENTION

FIG. 1 is a logic control diagram of a vehicle control system I based on human face recognition according to an embodiment of the invention. The vehicle control system I may generally comprise: an image acquisition device 100 acquiring current human face image information of a current occupant in a vehicle; a storage 200 storing one or more pieces of known human face image information and preset vehicle function configuration information corresponding to the known human face image information respectively; a processor 300 performing matching calculation on the current human face image information and the known human face image information so as to determine the matching human face image information which matches the current human face image information in the known human face image information; and an actuator 400 configuring the vehicle according to the vehicle function configuration information corresponding to the matching human face image information.

TABLE 1

| Known human face image information 1 | Vehicle function configuration information 11 |
| Known human face image information 2 | Vehicle function configuration information 21 |
| Known human face image information 3 | Vehicle function configuration information 31 |
| . . . | . . . |

Table 1 is a configuration table in which known human face image information corresponds to vehicle function configuration information according to an embodiment of the invention. The embodiment is illustrated as follows with reference to Table 1. The image acquisition device 100 acquires current human face image information A of a current occupant in a vehicle. As shown in Table 1, the storage 200 is used for storing multiple pieces of known human face image information 1, 2, 3 and preset vehicle function configuration information 11, 21, 31 corresponding to the known human face image information 1, 2, 3 respectively. The processor 300 performs matching calculation on the current human face image information A and the known human face image information 1, 2, 3 to determine the matching human face image information 2 which matches the current human face image information A in the known human face image information 1, 2, 3; and the actuator 400 configures the vehicle according to the vehicle function configuration information 21 corresponding to the matching human face image information 2. For example, it may configure the front and rear position, the high and low position of the main driver's seat and the posture of the main driver's seat.

With reference to FIG. 1, the vehicle control system I based on human face recognition of the invention acquires current human face image information by the image acquisition device 100, stores known human face image information and pre-stored vehicle function configuration information corresponding thereto by the storage 200, computes and determines human face image information matching the current human face image information in the known human face image information by the processor 300, and configures a vehicle according to corresponding vehicle function configuration information by the actuator 400. Since the vehicle control system I based on human face recognition of the invention can pre-store more passenger data, the invention may employ a touch-type manipulation system, and the vehicle function configuration information of the invention comprises driving function configuration information and non-driving function configuration information, and it overcomes the limitation of the prior art that the fixed button setting can only be three to five, and overcomes the limitation of the prior art that it can only adjust the seat, the invention can satisfy individualized needs of different drivers, enable the user of a vehicle to obtain better user experience, obtain an appropriate in-vehicle environment and good driving operation performance, and greatly improve the comfort of the vehicle.

In this embodiment, with reference to FIG. 1, the storage 200, the processor 300 and the actuator 400 may be configured in an on-board computer to make full use of the original configuration of the vehicle and reduce the cost. In other embodiments, the storage 200, the processor 300 and the actuator 400 may also be separately set components.

TABLE 2

| At main driver's seat | Vehicle function configuration information | |
|---|---|---|
| | Driving function configuration information | Non-driving function configuration information |
| Known human face image information 1 | Configuration content 11 | Configuration content 12 |
| Known human face image information 2 | Configuration content 21 | Configuration content 22 |
| Known human face image information 3 | Configuration content 31 | Configuration content 32 |
| . . . | . . . | . . . |

Table 2 is a function configuration table individualized by an embodiment of the invention only according to the drivers' difference.

In particular, with reference to FIG. 1, in this embodiment, the image acquisition device 100 may be arranged to only acquire the current human face image information of the current occupant at the main driver's seat of the vehicle. More particularly, with reference to Table 2, the vehicle function configuration information comprises driving function configuration information and non-driving function configuration information. The driving function configuration information comprises at least one of the following: the preset position information of the main driver's seat, namely, the preset front and rear position information and/or the preset high and low position information of the main driver's seat, the preset posture information of the main driver's seat, the preset angle information of the rearview mirror, the front and rear position information and/or the high and low position information of the steering wheel, the sport mode information or the comfort mode information of the gearbox, and the information on whether the parking start-stop mode is opened for the engine. The non-driving function configuration information comprises at least one of the following: the air conditioning temperature setting information, the sound category information and/or the volume information, and the information on whether the in-vehicle light is turned on and/or the light brightness.

It needs to be noted that the driving function configuration information referred to here is not restricted to the above listed information, but may also comprise other driving function configuration information related to driving, and the non-driving function configuration information is not restricted to the above listed information, but may also comprise other non-driving function configuration information which is not related to driving and can improve the interior environment of the vehicle.

In a specific implementation, according to Table 2, the illustration is as follows. The vehicle control system I acquires the current human face image information of the current occupant at the main driver's seat, and the processor 300 performs matching calculation on the current human face image information A and the known human face image information 1, 2, 3 to determine the matching human face image information 2 which matches the current human face image information A in the known human face image information 1, 2, 3; and the actuator 400 configures the vehicle according to the driving function configuration information 21 and the non-driving function configuration information 22 corresponding to the matching human face image information 2, for example, configures the front and rear position, the high and low position of the main driver's seat and the posture of the main driver's seat, as well as the sound category and the volume.

It needs to be noted that the actuator 400 of the vehicle control system I of the invention configures the vehicle according to the driving function configuration information, for example, the preset position information of the main driver's seat, namely, the preset front and rear position information and/or the preset high and low position information of the main driver's seat, the preset posture information of the main driver's seat, and the front and rear position information and/or the high and low position information of the steering wheel, which is performed in a state in which the vehicle is stopped stably, and the configuration will not be performed when the vehicle is running.

The vehicle control system I of the invention configures the vehicle according to the vehicle function configuration information, which may be operated manually, or also may be operated automatically. In particular, the vehicle control system I records and learns the driving habits of a driver whose identity is certified based on human face recognition, for example, configures the gearbox to be the sport mode information or the comfort mode information of the gearbox, to satisfy the driving habits of the driver. The configuration is generally established on the basis of self-learning the operation habits of the driver, that is, determined by learning the frequency at which the driver switches the gearbox mode at the time of driving, and in particular, after the vehicle control system I identifies the identity, it automatically switches to a corresponding driving mode.

In particular, in this embodiment, with reference to FIG. 1, the image acquisition device 100 may be arranged to be capable of acquiring the current human face image information of multiple current occupants at multiple seating positions of the vehicle, and the processor 300 is further used for determining the seating position where the current occupant corresponding to the current human face image information is in the vehicle. In the embodiment, with reference to FIG. 1, the image acquisition device 100 may comprise multiple cameras correspondingly arranged at the multiple seating positions of the vehicle respectively, and the processor 300 determines the seating position of the current occupant corresponding to the current human face image information according to the camera corresponding to the current human face image information. In other embodiments, with reference to FIG. 1, the image acquisition device 100 may comprise a camera arranged to be capable of acquiring current human face image information of the multiple current occupants at the multiple seating positions in the vehicle at one time, and the processor 300 determines the seating position of the current occupant corresponding to the current human face image information by way of image processing. In other embodiments, with reference to FIG. 1, the image acquisition device 100 may comprise a camera arranged to be capable of acquiring current human face image information of the multiple current occupants at the multiple seating positions in the vehicle by way of scanning, and the processor 300 determines the seating position of the current occupant corresponding to the current human face image information according to the scanning position and/or angle of the camera corresponding to the current human face image information.

It needs to be noted that, in the above embodiments, the camera employs a color image input to cause the captured image and action to be recognized more easily, and when the brightness of the environment in the vehicle is decreased, the camera is automatically switched to a grayscale image input and opens an infrared camera mode, to accurately capture the facial features and the facial actions of the driver at night or in an environment in which the tunnel light is dark, thereby accurately controlling and adjusting the vehicle.

TABLE 3

| | Vehicle function configuration information | | | | | |
|---|---|---|---|---|---|---|
| | | Non-driving function configuration information | | | | |
| | Driving function configuration information | Main driver's seat | Front passenger seat | The seat behind the front passenger seat | Other seating positions | Preset priority of non-driving function configuration information |
| Known human face image information 1 | Configuration content 11 | Configuration content 12 | Configuration content 13 | Configuration content 14 | Configuration content 15 | 3 |
| Known human face image information 2 | Configuration content 21 | Configuration content 22 | Configuration content 23 | Configuration content 24 | Configuration content 25 | 1 |
| Known human face image information 3 | Configuration content 31 | Configuration content 32 | Configuration content 33 | Configuration content 34 | Configuration content 35 | 2 |
| ... | ... | ... | ... | ... | ... | ... |

Table 3 is a function configuration table individualized by an embodiment of the invention according to the difference among multiple different occupants.

As shown in Table 3, in this embodiment, in a case in which there are multiple occupants, the vehicle function configuration information comprises the driving function configuration information and the non-driving function configuration information corresponding to the multiple occupants.

The driving function configuration information comprises at least one of the following: the preset position information of the main driver's seat, namely, the preset front and rear position information and/or the preset high and low position information of the main driver's seat, the preset posture information of the main driver's seat, the preset angle information of the rearview mirror, the front and rear position information and/or the high and low position information of the steering wheel, the sport mode information or the comfort mode information of the gearbox, and the information on whether the parking start-stop mode is opened for the engine.

The non-driving function configuration information comprises at least one of the following: the position information of the front passenger seat, namely, the front and rear position and/or the high and low position of the front passenger seat, the posture information of the front passenger seat, the posture information of the seat behind the front passenger seat, the posture information of other seats, the air conditioning temperature setting information, the sound category information and/or the volume information, the information on whether the in-vehicle light is turned on and/or the light brightness, and the back row entertainment program selection information.

It needs to be noted that the driving function configuration information referred to here is not restricted to the above listed information, but may also comprise other driving function configuration information related to driving, and the non-driving function configuration information is not restricted to the above listed information, but may also comprise other non-driving function configuration information which is not related to driving and can improve the interior environment of the vehicle.

More particularly, with reference to Table 3, in this embodiment, in a case in which there are multiple occupants, the actuator 400 configures the vehicle according to the driving function configuration information corresponding to the matching human face image information corresponding to the current human face image information of the current person at the main driver's seat of the vehicle. This instance is illustrated taking Table 3 as an example. The vehicle control system I acquires the current human face image information of the current occupant at the main driver's seat, and the processor 300 performs matching calculation on the current human face image information A and the known human face image information 1, 2, 3 to determine the matching human face image information 1 which matches the current human face image information A in the known human face image information 1, 2, 3; and the actuator 400 configures the vehicle according to the driving function configuration information 11 corresponding to the matching human face image information 1, for example, configures the front and rear position of the main driver's seat.

More particularly, with reference to Table 3, in this embodiment, in a case in which there are multiple occupants, the storage 200 may be further used to store the preset priorities of the non-driving function configuration information corresponding to the known human face image information. The actuator 400 may configure the vehicle according to the non-driving function configuration information with the highest preset priority in multiple pieces of non-driving function configuration information corresponding to the matching human face image information corresponding to multiple pieces of known human face image information. This instance is illustrated taking Table 3 as an example. The vehicle control system I acquires current human face image information of the current occupants at the individual positions of the vehicle, and the processor 300 performs matching calculation on the current human face image information A, B, C and the known human face image information 1, 2, 3 to determine in the known human face image information 1, 2, 3 the matching human face image information 1 which matches the current human face image information A, the matching human face image information 3 which matches the current human face image information B, and the matching human face image information 2 which matches the current human face image information C; and the actuator 400 configures the vehicle according to the non-driving function configuration information 23, 24, 25 with the highest preset priority in the multiple pieces of non-driving function configuration information corresponding to the matching human face image information corresponding to the multiple pieces of known human face image information, for example, configures the front and rear position of the front passenger seat, the air conditioning temperature, the back row entertainment program type and the volume.

In a specific implementation, the occupants of the vehicle may comprise drivers, old persons, children and women, and the preset priorities of the non-driving function configuration information are successively old persons, children, women and drivers in an order from high to low. In another embodiment, a specific person is seated in the seat behind the front passenger seat, for example, a fat person, a tall person or a supervisor/boss, and at this point, when nobody is seated in the front passenger seat, the front passenger seat is automatically adjusted forward to provide the back row with a larger seating space. In a further embodiment, when a short child is recognized, the driver may be reminded that a child seat should be used to protect the seating safety of the child.

The vehicle control system I may be operated manually by the driver, or may operate automatically by the vehicle control system I automatically opening the learning mode.

TABLE 4

| non-driving function configuration information | | |
|---|---|---|
| Rest state | Talk state | Other devices |
| Configuration content | Configuration content | Configuration content |
| Configuration content | Configuration content | Configuration content |
| ... | ... | ... |

Table 4 is a function configuration table individualized by an embodiment of the invention according to other non-driving function configuration information related with human face actions.

In this embodiment, with reference to Table 4, the non-driving function configuration information is configured according to the rest state, the talk state or other devices. In a specific implementation, the image acquisition device 100 acquires a current human face action of a current occupant in the vehicle, and associates the non-driving function configuration information, e.g., the sound volume information, with the human face action, and the processor 300 judges that the current occupant is sleeping or talking, and may suitably reduce the volume, and the extent of volume reduction is preferably between 50%~80% of the original volume.

In addition, by means of the vehicle control system I based on human face recognition as described in the invention, a device for recognizing a person in the vehicle after parking may further be added. In a case in which the vehicle is locked, once it is found that there are signs of a person in the vehicle, the information is sent to the mobile phone of the driver or the owner by the on-board computer over a wireless communication network, and the vehicle door is unlocked, the vehicle window is automatically opened, the emergency flashers of the vehicle are automatically turned on and/or the alarm sound is automatically sent out, and thus, it may be avoided that the owner leaves a child or a pet in the vehicle by mistake. According to the above principles, an appropriate way of control is chosen to make the vehicle control system I of the invention play the role of anti-theft.

So far, it shall be recognized by those skilled in the art that although multiple exemplary embodiments of the invention have already been illustrated and described in detail in this context, many other variations or modifications in line with the principles of the invention may still be directly determined or deduced according to the content disclosed in the invention, without departing from the spirit and scope of the invention. Therefore, the scope of the invention should be understood and deemed to cover all the other variations or modifications.

The invention claimed is:

1. A vehicle control system based on human face recognition, comprising:
    an image acquisition device, acquiring current human face image information of a current occupant in a vehicle;
    a storage, storing one or more pieces of known human face image information and preset vehicle function configuration information corresponding to the known human face image information respectively, the vehicle function configuration information comprising driving function configuration information and non-driving function configuration information;
    a processor, performing matching calculation on the current human face image information and the known human face image information so as to determine matching human face image information which matches the current human face image information in the known human face image information; and
    an actuator, configuring the vehicle according to the vehicle function configuration information corresponding to the matching human face image information;
    wherein the image acquisition device is arranged to be capable of acquiring current human face image information of multiple current occupants at multiple seating positions of the vehicle, and the processor is further used for determining the seating position where the current occupant corresponding to the current human face image information is in the vehicle;
    the actuator configures the vehicle according to the driving function configuration information corresponding to the matching human face image information corresponding to the current human face image information of the current person at a main driver's seat of the vehicle;
    the storage is further used to store preset priorities of the non-driving function configuration information corresponding to the known human face image information; the actuator configures the vehicle according to the non-driving function configuration information with the highest preset priority in multiple pieces of non-driving function configuration information corresponding to the matching human face image information corresponding to multiple pieces of known human face image information;
    the image acquisition device comprises one or multiple cameras which employ(s) a color image input and
    when a brightness of an environment in the vehicle is decreased, the one or multiple cameras is/are automatically switched to a grayscale image input and activate(s) an infrared camera mode.

2. The vehicle control system as claimed in claim 1, wherein when the image acquisition device comprises multiple cameras, the multiple cameras are correspondingly arranged at the multiple seating positions of the vehicle respectively, and the processor determines the seating position of the current occupant corresponding to the current human face image information according to one of the multiple cameras corresponding to the current human face image information.

3. The vehicle control system as claimed in claim 1, wherein when the image acquisition device comprises a camera, the camera is arranged to be capable of acquiring current human face image information of the multiple current occupants at the multiple seating positions in the vehicle at one time, and the processor determines the seating position of the current occupant corresponding to the current human face image information by way of image processing.

4. The vehicle control system as claimed in claim 1, wherein when the image acquisition device comprises a camera, the camera is arranged to be capable of acquiring current human face image information of the multiple current occupants at the multiple seating positions in the vehicle by way of scanning, and the processor determines the seating position of the current occupant corresponding to the current human face image information according to a scanning position and/or angle of the camera corresponding to the current human face image information.

5. The vehicle control system as claimed in claim 1, wherein the non-driving function configuration information is configured according to a rest state or a talk state of a current occupant; and
the one or multiple cameras acquire(s) a current human face action of a current occupant in the vehicle and associate(s) the non-driving function configuration information with the current human face action to match current requirements of the occupant.

6. The vehicle control system as claimed in claim 1, wherein the actuator configures the vehicle according to the driving function configuration information corresponding to the matching human face image information corresponding to the current human face image information of the current person at the main driver's seat of the vehicle in a state in which the vehicle is stopped stably.

7. The vehicle control system as claimed in claim 1, wherein the configuration of the vehicle according to the vehicle function configuration information corresponding to the matching human face image information is operated manually.

8. The vehicle control system as claimed in claim 1, wherein the vehicle control system records and self-learns driving habits of a driver whose identity is certified based on human face recognition; and
the configuration of the vehicle according to the vehicle function configuration information corresponding to the matching human face image information is operated automatically on the basis of the self-learned driving habits of the driver.

9. The vehicle control system as claimed in claim 1, further comprising:
a device for recognizing a person in the vehicle that is configured to find whether there are signs of a person in the vehicle in a case in which the vehicle is locked.

10. The vehicle control system as claimed in claim 9, wherein the device for recognizing a person in the vehicle is further configured to, if it is found that there are signs of a person in the vehicle in a case in which the vehicle is locked, send information to a mobile phone of the driver or an owner of the vehicle, and perform at least one of operations including unlocking the vehicle, automatically opening windows of the vehicle, automatically turning on emergency flashers of the vehicle, or automatically sending out an alarm sound.

* * * * *